(12) United States Patent
Hart et al.

(10) Patent No.: US 8,435,334 B2
(45) Date of Patent: May 7, 2013

(54) FUEL STORAGE TANK PRESSURE MANAGEMENT SYSTEM INCLUDING A CARBON CANISTER

(75) Inventors: Robert P. Hart, East Hampton, CT (US); Kent Reid, Canton, CT (US)

(73) Assignee: Veeder-Root Company, Simsbury, CT (US)

( * ) Notice: Subject to any disclaimer, the term of this patent is extended or adjusted under 35 U.S.C. 154(b) by 406 days.

(21) Appl. No.: 12/570,316

(22) Filed: Sep. 30, 2009

(65) Prior Publication Data

US 2010/0101422 A1 Apr. 29, 2010

Related U.S. Application Data

(60) Provisional application No. 61/101,520, filed on Sep. 30, 2008.

(51) Int. Cl.
*B01D 53/02* (2006.01)
(52) U.S. Cl.
USPC .................................. 96/108; 96/135; 96/147
(58) Field of Classification Search .................... 95/117, 95/126, 146, 273; 96/130, 135, 136, 131, 96/144, 153, 117.5, 110, 147, 134, 140, 141, 96/142, 152, 111, 112, 148; 55/385.4; 141/59
See application file for complete search history.

(56) References Cited

U.S. PATENT DOCUMENTS

| | | | |
|---|---|---|---|
| 4,259,097 A * | 3/1981 | Patel et al. ....................... 96/136 |
| 5,037,454 A * | 8/1991 | Mann .............................. 95/126 |
| 5,038,815 A * | 8/1991 | Palmer ........................... 137/237 |
| 5,092,911 A * | 3/1992 | Williams et al. ................. 95/117 |
| 5,671,785 A | 9/1997 | Andersson | |
| 5,755,854 A | 5/1998 | Nanaji | |
| 5,782,275 A | 7/1998 | Hartsell, Jr. et al. | |
| 5,914,457 A * | 6/1999 | Itakura et al. ................... 96/130 |
| 6,499,516 B2 | 12/2002 | Pope et al. | |
| 6,569,228 B2 * | 5/2003 | Ito .................................. 96/134 |
| 6,616,737 B1 * | 9/2003 | Evans et al. ..................... 96/135 |

(Continued)

OTHER PUBLICATIONS

PCT International Search Report and Written Opinion of the International Searching Authority dated Nov. 24, 2009 for PCT/US2009/058987 filed Sep. 30, 2009, corresponding to co-pending U.S. Appl. No. 12/570,316.

*Primary Examiner* — Duane Smith
*Assistant Examiner* — Minh-Chau Pham
(74) *Attorney, Agent, or Firm* — Nelson Mullins Riley & Scarborough, LLP (57) ABSTRACT

A carbon canister for use with a fuel storage system having a fuel storage tank and a vent line connected thereto. The carbon canister includes an inner container having a first end and a second end, an outer container having a first end and a second end, the outer container being disposed about an outer surface of the inner container such that the outer container and the inner container are concentric. A first end plate is disposed at the first end of the inner container and the first end of the outer container and a second end plate is disposed at the second end of the inner container and the second end of the outer container, such that a first volume is defined by the inner container, the outer container, the first end plate and the second end plate, and hydrocarbon adsorbing activated carbon disposed in the first volume. The vent line of the fuel storage tank is external to the carbon canister and the first volume of the carbon canister is in fluid communication with the fuel storage tank.

21 Claims, 6 Drawing Sheets

U.S. PATENT DOCUMENTS

| | | | |
|---|---|---|---|
| 6,623,549 B1 * | 9/2003 | Evans et al. | 96/117.5 |
| 6,942,721 B2 * | 9/2005 | Oh et al. | 96/135 |
| 7,314,508 B2 * | 1/2008 | Evans | 96/135 |
| 7,566,358 B2 * | 7/2009 | Hart et al. | 96/110 |
| 7,758,674 B2 * | 7/2010 | Dallas et al. | 95/273 |
| 2003/0079610 A1 * | 5/2003 | Hayes et al. | 96/135 |
| 2004/0016342 A1 * | 1/2004 | Fornof et al. | 95/117 |
| 2005/0241479 A1 | 11/2005 | Lebowitz et al. | |
| 2007/0131111 A1 | 6/2007 | Hart et al. | |
| 2007/0266851 A1 | 11/2007 | Fink | |

* cited by examiner

Fig. 5C

FUEL STORAGE TANK PRESSURE MANAGEMENT SYSTEM INCLUDING A CARBON CANISTER

CLAIM OF PRIORITY

This application claims priority to U.S. Provisional Patent Application Ser. No. 61/101,520, filed Sep. 30, 2008, the entire disclosure of which is incorporated by reference herein.

FIELD OF THE INVENTION

The present invention relates to a fuel storage tank pressure management system including a carbon canister to adsorb hydrocarbons and reduce pressure inside a fuel storage tank to prevent fugitive emissions.

BACKGROUND OF THE INVENTION

The growing population of vehicles in the U.S. with Onboard Refueling Vapor Recovery (ORVR) equipment installed is resulting in increased vaporization occurring in underground storage tanks (USTs). When a vehicle equipped with an ORVR system refuels at a Gasoline Dispensing Facility (GDF), fresh air is returned to the tank instead of saturated vapor, as is the case when a standard vehicle refuels. This returned fresh air causes increased evaporation of the fuel in the USTs. This increased evaporation results in continuously rising pressures in the ullage spaces of USTs. If pressures rise above ambient atmospheric pressure, fuel vapor emissions can occur because UST systems are not perfectly tight.

New Stage II Vapor Recovery requirements in the state of California require that UST systems maintain ullage pressures that average less than ¼ inch of water column above ambient pressure. Current front-end ORVR detection systems for GDFs provide active pressure control when the GDF is in operation and there are ORVR vehicles refueling, but may allow the UST to overpressurize during periods of station closure or low vehicle activity. To avoid the possibility of overpressurization of the UST, a back-end vapor processor is needed to process the excess vapor caused by evaporation.

Typically, processors on the market today were designed to work on systems that do not use front-end ORVR detection systems to limit the amount of air that is ingested into the UST. There is a need for a system capable of processing small amounts of vapor necessary to keep a UST system in compliance during periods of station shutdown or low activity. A prior solution that handled small amounts of vapor is the Healy Systems' bladder tank described in U.S. Pat. No. 6,805,173 B2. This solution consists of a large above ground tank with a flexible bladder liner. Because the tank is large, it can be difficult to locate and install at GDFs, and is, therefore, not generally desired by users.

The present disclosure recognizes and addresses the foregoing considerations, and others, of prior art constructions and methods.

SUMMARY OF THE INVENTION

One embodiment of the present disclosure provides a carbon canister for use with a fuel storage system having a fuel storage tank and a vent line connected thereto. The carbon canister includes an inner container having a first end and a second end, an outer container having a first end and a second end, the outer container being disposed about an outer surface of the inner container such that the outer container and the inner container are concentric. A first end plate is disposed at the first end of the inner container and the first end of the outer container and a second end plate is disposed at the second end of the inner container and the second end of the outer container, such that a first volume is defined by the inner container, the outer container, the first end plate and the second end plate, and hydrocarbon adsorbing activated carbon disposed in the first volume. The vent line of the fuel storage tank is external to the carbon canister and the first volume of the carbon canister is in fluid communication with the fuel storage tank.

An alternate embodiment of the present disclosure provides a carbon canister for use with a fuel storage system having a fuel storage tank and a vent line connected thereto. The carbon canister includes a first container having a first end and a second end. A first end plate is disposed at the first end of the first container, the first end plate including an inlet port, a base plate, an air passage aperture defined by the base plate, and an air channel that extends from the inlet port to the air passage aperture such that the air channel is in fluid communication with the first volume of the carbon canister, and a second end plate is disposed at the second end of the first container such that a first volume is defined by the first container, the first end plate and the second end plate, and hydrocarbon adsorbing activated carbon disposed in the first volume. The first volume of the carbon canister is in fluid communication with the fuel storage tank.

BRIEF DESCRIPTION OF THE DRAWINGS

The accompanying drawing figures incorporated in and forming a part of this specification illustrate several aspects of the invention, and together with the description serve to explain the principles of the invention.

Repeat use of reference characters in the present specification and drawings is intended to represent same or analogous features or elements of the invention according to the disclosure.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The disclosure of U.S. Patent Application Publication No. 2007/0131111, now U.S. Pat. No. 7,566,358, issued Jul. 28, 2009, is incorporated herein by reference in its entirety.

Figure 1:
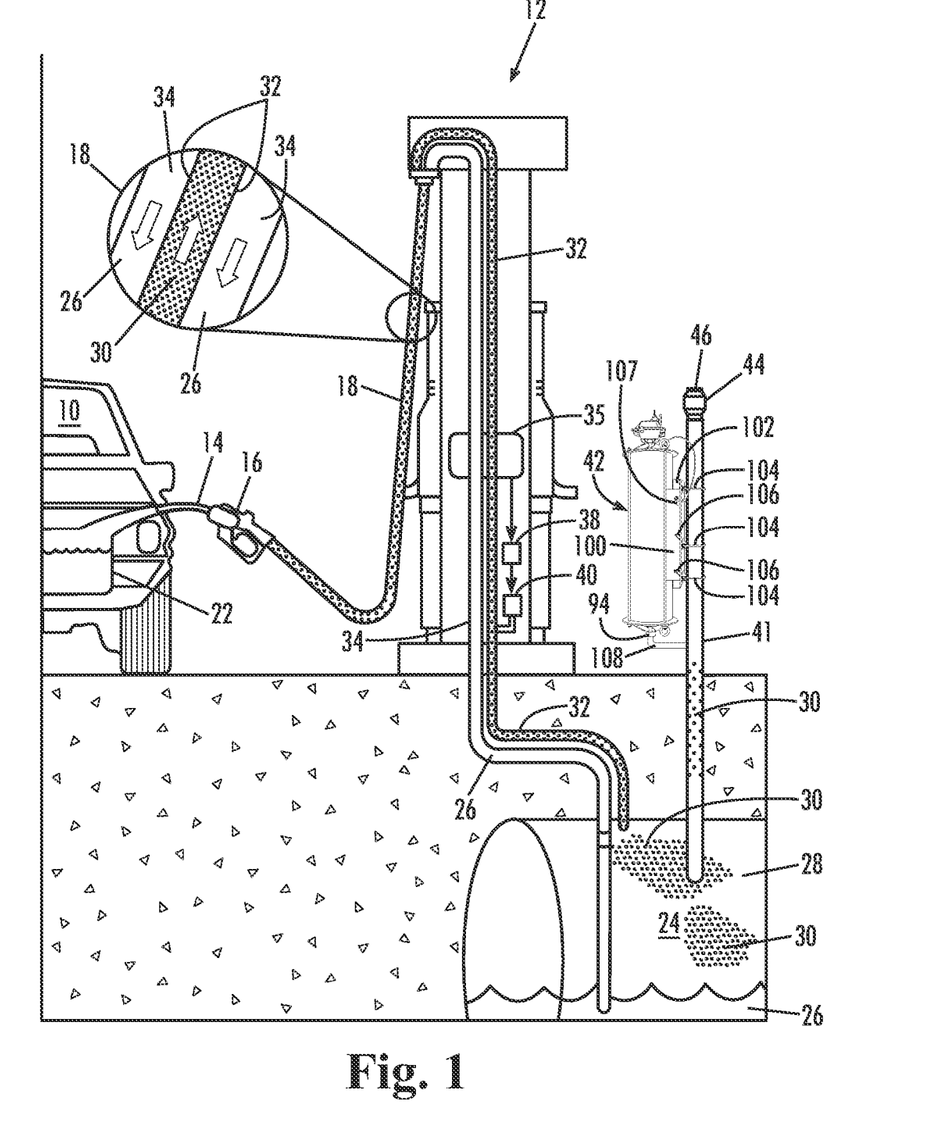
FIG. 1 is an illustration of a Stage II vapor recovery-equipped fuel dispenser and fuel storage tank in a service station environment employing a carbon canister in accordance with the present invention.

FIG. 1 illustrates a typical Stage II vapor recovery-equipped fuel dispensing system in a service station environment employing a carbon canister, in accordance with the present invention, for adsorbing hydrocarbons from the UST. A vehicle 10 is proximate to a fuel dispenser 12 for refueling. The fuel dispenser 12 includes a nozzle 16 with a spout 14. The nozzle 16 is connected to a hose 18, which is fluidly coupled to an underground storage tank (UST) 24 where liquid gasoline 26 resides. When the customer is dispensing gasoline 26 into his vehicle 10, the customer removes the nozzle 16 from the fuel dispenser 12 and inserts the spout 14 into the filler neck of a vehicle fuel tank 22. The fuel dispenser 12 is then activated, and the liquid gasoline 26 is pumped by a pump (not shown) from the UST 24 through a fuel supply conduit 34 into the hose 18, eventually being delivered through the nozzle 16 and spout 14 into the vehicle fuel tank 22.

The fuel dispenser 12 illustrated in FIG. 1 is also equipped with an assist-type Stage II vapor recovery system for exemplary purposes, whereby vapors 30 expelled from the vehicle fuel tank 22 are captured using a suction force created by a pump as liquid fuel 26 is dispensed into the vehicle fuel tank 22. However, the present invention is equally applicable for "balance" type, non-assist Stage II vapor recovery equipped dispensers, whereby assistance of an external pump or suction force is not provided since the nozzle 16 forms a sealed, closed system with the vehicle 10 where vapors expelled from the vehicle 10 are forced back inside the nozzle spout 14 under an equal exchange principle. The hose 18 contains not only the fuel supply conduit 34 which serves as a delivery passage for liquid fuel 26 to enter into the vehicle fuel tank 22, but also a vapor return passage 32, whereby vapors 30 captured during fueling of the vehicle fuel tank 22 are returned back to the UST 24. FIG. 1 contains an enlarged view of the hose 18 showing the fuel supply conduit 34 and the vapor return passage 32.

In the example of an assist-type Stage II vapor recovery equipped dispenser, when a customer begins a fueling transaction, the fuel dispenser's control system 35 activates a motor 38, which in turn activates a vapor pump 40 coupled to the vapor return passage 32. The motor 38 may be a constant speed or variable speed motor. When the motor 38 activates the vapor pump 40, a suction is created in the vapor return passage 32, and vapor 30 expelled from the vehicle fuel tank 22 is drawn into the spout 14 of the nozzle 16 and into the vapor return passage 32. The vapor 30 then flows back to a ullage area 28 of the UST 24. The ullage area 28 is the portion of the storage tank that does not contain liquid fuel 26. More information on vapor recovery systems in the service station environment can be found in U.S. Pat. Nos. Re 35,238; 5,040,577; 5,038,838; 5,782,275; 5,671,785; 5,860,457; and 6,131,621, all of which are incorporated herein by reference in their entireties.

A tank vent line or pipe 41 is also coupled to the UST 24, and more particularly to the ullage 28 of the UST 24. The tank vent line 41 is coupled to tubing 108 connected to the inlet of a carbon canister 42 filled with hydrocarbon adsorbing activated carbon. When UST 24 pressure rises slightly above ambient, fuel vapors 30 and air enter into the carbon canister 42 through inlet port 94 (illustrated in FIG. 3) where hydrocarbons are adsorbed onto the activated carbon. The cleansed air vents through a flow outlet port which may include a flow-limiting orifice with a known calibrated flow rate that vents in a controlled fashion to atmosphere. The removal of fuel vapor 30 and air from the UST 24 system limits pressure in the UST 24 system and prevents excessive positive pressure from occurring. The activated carbon is purged of hydrocarbons by means of reverse air flow caused by negative UST 24 pressures that occur during periods of ORVR vehicle refueling. A typical pressure/vacuum (P/V) relief valve 44 may be provided with a vent port 46 to atmosphere in the event that the carbon canister 42 cannot prevent excess pressures from occurring in the UST 24.

As fueling resumes or traffic increases at the GDF, the pressure in the UST 24 will become negative due to removal of liquid fuel and a deficit of returned vapors from ORVR equipped vehicles. In this embodiment, air from the outside atmosphere will enter the carbon canister 42 via its outlet port 52 (illustrated in FIG. 3) (now acting as an inlet) through the calibrated orifice at a controlled rate. Hydrocarbons will thus collect (purge) from the activated carbon in the carbon canister 42 and be returned back to the ullage space 28 of the UST system via the canister inlet port 94 (now acting as an outlet) and UST vent pipe 41. Once sufficient air has passed back through the carbon canister 42 to adequately purge the activated carbon of hydrocarbons, the carbon canister 42 will be prepared to once again repeat the process when the vehicle traffic declines and the pressure in the UST 24 rises. This process normally proceeds in a diurnally cyclical manner. In this embodiment, bidirectional flow, including purging, is driven passively by the normal positive and negative pressures that occur in UST systems, typically in a diurnal cycling manner. The carbon canister 42 thus requires little or no maintenance and has a long working life.

The carbon canister 42 may be mounted at any convenient location where there is access to the vapor space 28 (ullage space) of the UST system, such as on or near the UST vent pipe 41. The vent pipe 41 may be 2 inches in diameter, for example. The carbon canister 42 is connected to the UST vapor space 28 by any convenient means, such as a piping connection 108 to the vent pipe 41 via a conduit, tubing or other means.

Figure 2:
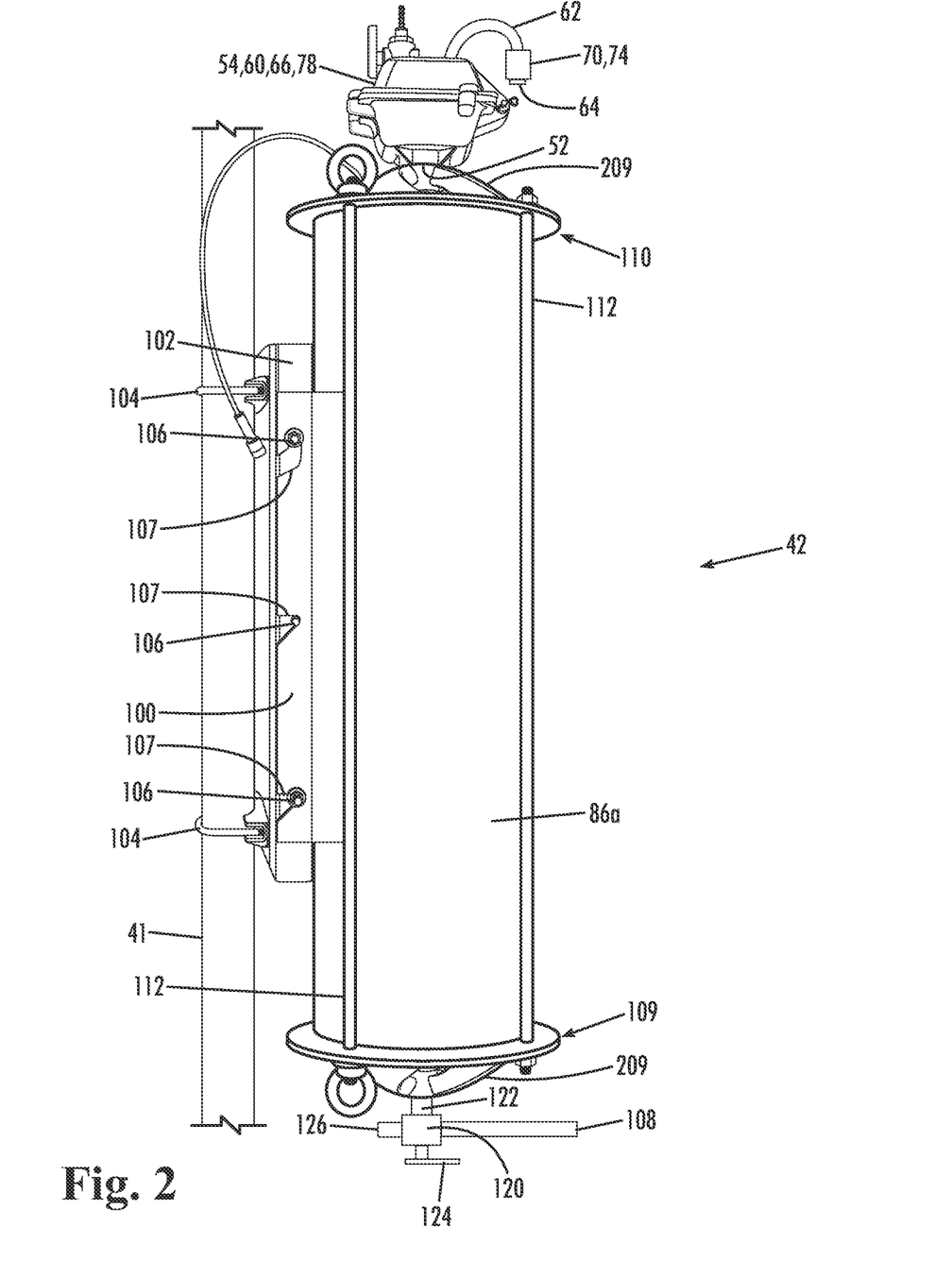
FIG. 2 is a perspective side view of the carbon canister, as shown in FIG. 1, and its supporting components.

A preferred embodiment of the carbon canister 42 is shown in FIG. 2. In the preferred embodiment, the carbon canister 42 is mounted to the outside of the vent pipe 41. Specifically, the carbon canister 42 is attached to the outside of the UST vent pipe 41 via an adapter plate 100 that is attached to a clamp support 102. The clamp support 102 is physically attached to the vent pipe 41 via one or more U-bolts 104. The adapter plate 100 has indentions or orifices 107 that are designed to receive bolts 106 attached to the clamp support 102 to secure the adapter plate 100 to the clamp support 102. Because the clamp support 102 is attached to the vent pipe and the carbon canister 42 is attached to the adapter plate 100, the carbon canister 42 is physically secured to the vent pipe 41.

Figure 3:
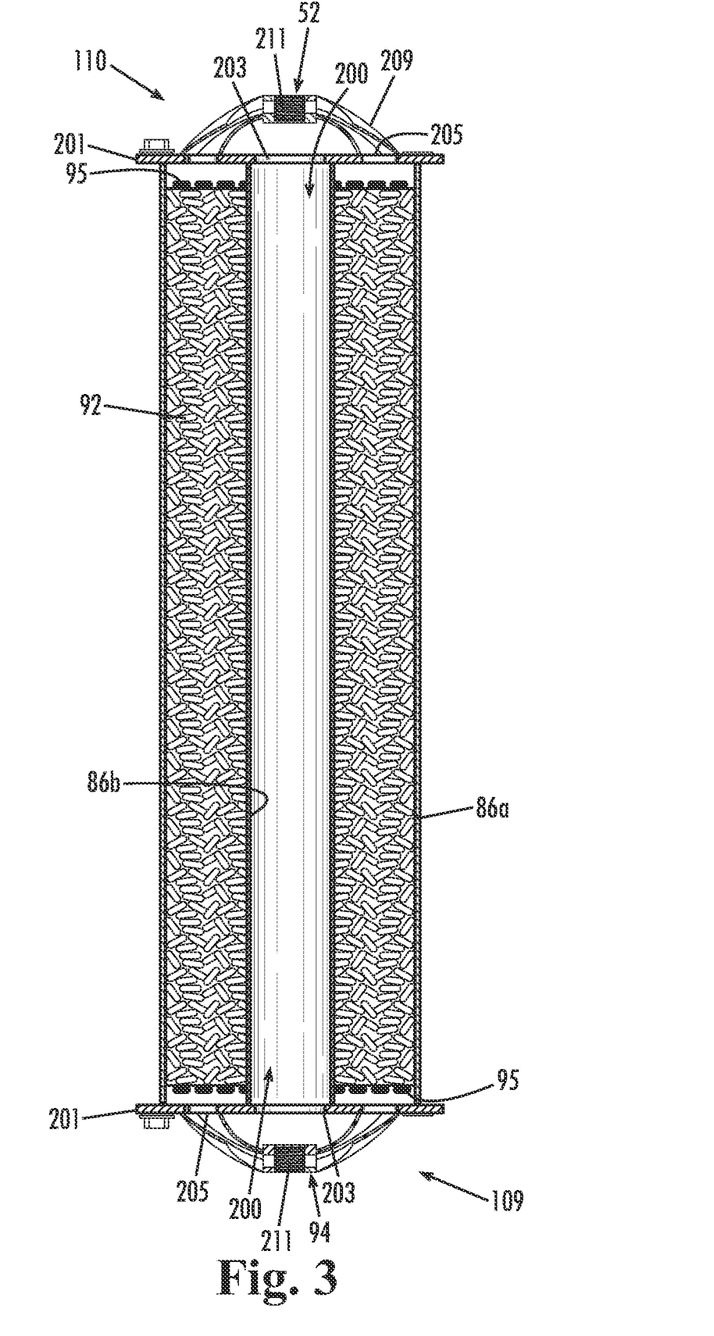
FIG. 3 is a cross-sectional view of the carbon canister as shown in FIG. 1.

Referring now also to FIG. 3, the carbon canister 42 contains an inlet port 94 for the hydrocarbon air mixture or vapor 30 from the UST 24 to enter and pass across the hydrocarbon adsorbing carbons (element 92 in FIG. 3). The inlet port 94 is fluidly coupled to the vent pipe 41 to receive the vapors 30 via a tubing or conduit 108 as illustrated. Cleansing of vapor 30 from the UST 24 and purging the hydrocarbons from the carbon 92 in the carbon canister 42 is performed as discussed above.

As shown in FIG. 3, the carbon canister 42 is comprised of a cylindrical-shaped outer container 86a and a cylindrical-shaped inner container 86b disposed concentrically therein and forming a volume therebetween. The inlet plate 109 and the outlet plate 110 are attached to the opposing ends of the outer and inner containers 86a and 86b to seal the carbon canister 42. In this embodiment, the inlet plate 109 and the outlet plate 110 are attached via bolts 112 (FIG. 2) that are disposed axially along the outer surface of the outer container 86a and pass through both of the plates. Hydrocarbon adsorbing carbon (element 92 in FIG. 3) is received in the volume bounded by the outer container 86a and the inner container 86b. Note, the inner surface of inner container 86b forms a passage 200 through the center of the carbon canister 42 such that air flow therethrough is permitted. This facilitated removal of heat that builds up in the carbon 92 during the adsorption process. The inlet port 94 is provided in the inlet plate 109 to allow the vapor 30 from the UST 24 to enter, as well as to allow the return of purged hydrocarbons back to the UST 24.

Figure 5A:
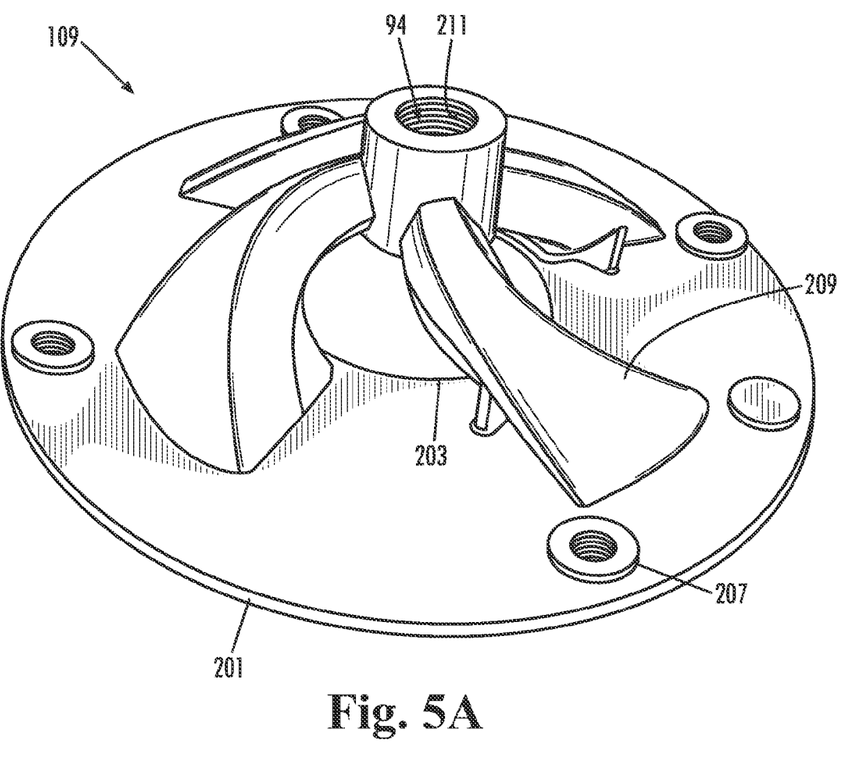
FIGS. 5A, 5B and 5C are perspective, top and bottom views, respectively, of an inlet plate of the canister as shown in FIG. 1.
Figure 5B:
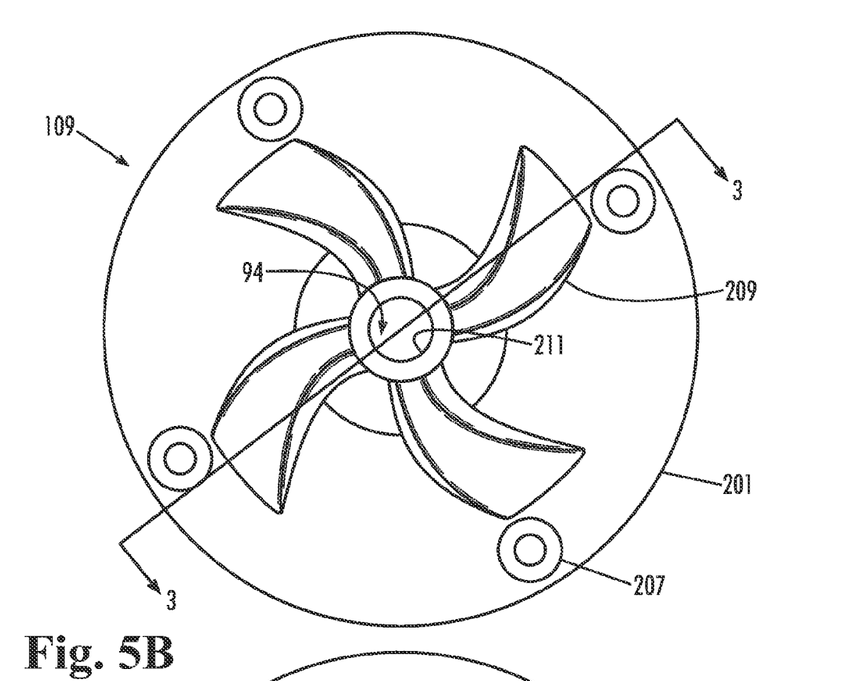
Figure 5C:
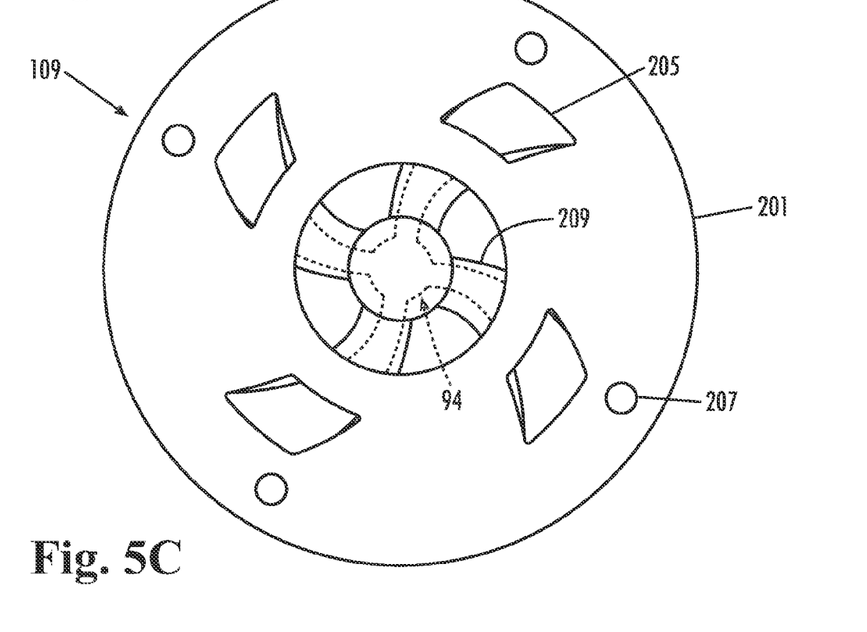

Referring additionally to FIGS. 5A through 5C, a preferred embodiment of the inlet plate 109 is discussed. Only the inlet plate 109 is discussed since in the preferred embodiment of the carbon canister 42, the inlet plate 109 and the outlet plate 110 are identical, although they need not be in alternate embodiments. The inlet plate 109 includes a base plate 201 that defines a central aperture 203, a plurality of air passage apertures 205 and a plurality of mounting apertures 207. As best seen in FIG. 3, the central aperture 203 aligns with and thus maximizes the capacity of the air passage 200 through the carbon canister 42 that is defined by the inner container 86b. The mounting apertures 207 are disposed about the peripheral edge of the base plate 201 such that they remain outside the outer container 86a when the inlet plate 109 is positioned adjacent the bottom end of the carbon canister 42. As such, the mounting apertures 207 can receive the mounting bolts 112, thereby securing the inlet plate 109 and outlet plate 110 to the ends of the carbon canister 42.

The inlet plate 109 also includes a plurality of air channels 209 that extend outwardly from the base plate 201 and radially inwardly such that the ends of the air channels 209 converge at the inlet port 94. Note, each air channel 209 becomes larger as the air flow moves through each air channel 209 from the inlet port 94 to the corresponding air passage aperture 205 in the base plate 201. As such, hydrocarbon laden vapors 30 from the UST 24 are allowed to expand as they move through the plurality of air channels 209.

The air channels 209 of the inlet plate 109 and the outlet plate 110 at the bottom and the top of the carbon canister 42, respectively, allow vapors 30 entering into the inlet port 94 on their way to the carbon 92 for hydrocarbon adsorption to expand, and allow outside air entering through the outlet port 52 on its way to the carbon 92 for hydrocarbon purging to expand as well. As such, the air channels 209 more evenly spread the vapor/air flow to the carbon 92 to provide for greater adsorption and/or purging for greater performance and/or greater hydrocarbon load. Uneven vapor 30 flow across the carbon 92 may result in some of the carbon 92 becoming saturated before other carbon 92 located at different locations within the carbon canister 42, thereby resulting in an effectively reduced overall hydrocarbon load. As well, uneven air flow across the carbon 92 may result in some of the carbon 92 being not adequately purged.

In the illustrated embodiment, each air channel 209 is curved from the inlet port 94 to its corresponding air passage aperture 205. In the preferred embodiment shown, each air channel 209 is curved in the counter-clockwise (CCW) direction from inlet port 94 to plate 201. However, alternate embodiments can include air channels that are curved in the clockwise (CW) direction. The curvature of the air channels 209 imparts a rotational component on the vapors 30 as they flow through the air channels 209. As such, as the vapors 30 flow axially through the carbon canister 42, they also rotate about the inner container 86b in a CCW direction. By imparting the radial component on the flow, the air channels 209 cause the vapors 30 to travel "farther" through the carbon 92 as they flow through the carbon canister 42. In essence, the air channels 209 increase the effective length of the carbon canister 42 for its given actual length. The curvature also increases the length of air channels 209 for a given height above base plate 201. This may produce more consistent flow.

As previously noted, vapor 30 leaving the ullage 28 of the UST 24 enters into the vent pipe 41 and travels into the carbon canister 42. The vapor/air or hydrocarbon air mixture is then cleansed inside the carbon canister 42, and the cleansed air is released through an outlet port 52 of the carbon canister 42 (outlet port 52 of outlet plate 110), eventually to atmosphere. An optional solenoid operated control valve 54 may be provided which is coupled to the outlet port 52 and is under control of a controller (not shown), such as a site controller, tank monitor, or any other control system. The controller is thus able to send a signal over a signal line to turn vapor and air flow through the carbon canister 42 on and off based on feedback from a pressure sensor or pressure switch installed somewhere in the ullage space 28 of the UST 24, or in the vent pipe 41 or its path. The solenoid operated control valve 54 may also be coupled to the inlet port 94 in the carbon canister 42 to perform the same function.

The controller may also receive feedback from a hydrocarbon sensor installed in the outlet piping of the carbon canister 42 so that the vapor and air flow through the carbon canister 42 may be secured with the solenoid operated control valve based on feedback regarding the levels of hydrocarbon being released to the atmosphere as reported by the hydrocarbon sensor. Preferably, the control valve 54 is a fail safe valve. More specifically, the control valve is spring biased in the shut direction and held open magnetically. As such, if power is secured to the control valve 54, such as during a power failure, the control valve 54 will fail in the shut position.

Valving control to turn on and off vapor and air flow through the carbon canister 42 provides the ability to isolate the carbon canister 42 from the UST 24 containment system. This is important in California where regulations now require GDFs to install Enhanced Vapor Recovery (EVR) systems with In-Station Diagnostics (ISD) monitors. As disclosed in commonly owned U.S. Pat. No. 6,622,757, incorporated herein by reference in its entirety, one of the ISD monitoring tests is a vapor leak test of the UST containment system. Since the carbon canister 42 is a vapor leak path, the ISD test can measure the leak and incorrectly issue a test fail result and alarm. The addition of the solenoid control valve 54 can serve to provide carbon canister 42 off-time when the ISD test can be performed without risk of false alarm.

Further, an optional manually operated shut-off valve 60, such as a ball valve, may be provided in the same or similar location and in lieu of or in addition to the solenoid operated control valve 54 coupled to the outlet port 52, or coupled to the inlet port 94 of the carbon canister 42, that would give a service technician the ability to turn vapor 30 and air flow through the carbon canister 42 on and off. Similar to the solenoid operated control valve 54 embodiment, this would provide the ability to isolate the carbon canister 42 from the UST containment system, but in a manual fashion. This is important where regulations require a UST containment system vapor leak test to be run periodically or for diagnostic purposes. An example of this kind of test is the California TP-201.3 pressure decay test. Since the carbon canister 42 is a vapor leak path, the manual test will measure the effects of the leak which will incorrectly result in a test fail result. The addition of the manual shut-off valve 60 serves to eliminate this problem by allowing the service technician to shut off the carbon canister 42 flow during a leak test. An alternate way to accomplish this is to use a threaded output pipe or fitting to which a plug or cap can be attached to seal off the outlet port 52 during a leak test.

Another embodiment that can serve to remedy the above mentioned ISD vapor leak test problem is provided by a mathematical adjustment to the leak test result. Since a calibrated flow orifice is used in some preferred embodiments, the flow rate versus pressure is known to a reasonable degree of accuracy. This known leak rate is used as a baseline "zero" system leak condition and is subtracted off of the ISD measured "gross" leak rate to yield an accurate "net" leak rate for the rest of the UST containment system. This net rate is the desired result for satisfying the California ISD leak test requirement. This solution is cost-free and is therefore preferable to the solenoid valve approach for ISD leak rate testing needs.

The outlet port 52 may also consist of or be coupled to a tube or conduit 62 for eventual release of cleansed air to an outlet port 64 disposed at its distal end. For example, the outlet port 64 may consist of a ¼ inch pipe and fittings. A flow-limiting orifice 66 may be provided between the carbon canister outlet port 52 and the outlet port 64 to atmosphere with a known calibrated flow rate that vents cleansed air in a controlled fashion to the outlet port 64 to atmosphere. The flow-limiting orifice 66 may be 0.089 inches in diameter, for example.

As illustrated in FIG. 2, an optional hydrocarbon sensor 78 may be mounted in the outlet port 52 flow path to measure the degree of hydrocarbon cleansing achieved by the carbon canister 42. When the UST 24 and carbon canister 42 are in a positive pressure condition, it is known that there is a cleansed air outflow past the hydrocarbon sensor 78. The outflow hydrocarbon concentration is then monitored by the controller (not shown), via a communication line, and compared to a pass/fail threshold to indicate whether the carbon canister 42 is performing adequately or as needed. Note, hydrocarbon sensor 78 can be used to help determine the total amount of hydrocarbon being released to the atmosphere in addition to monitoring pass/fail conditions of the system. UST 24 (or carbon canister 42) pressure may be measured by either adding a pressure sensor inside the UST 24, or coupled to the outlet port 52, via a communication line, for that purpose, or by making use of an existing ISD monitoring pressure sensor, and optionally, its controller to perform the monitoring tasks. Note that an air sensor, such as a nitrogen or oxygen sensor, could also be used in place of the hydrocarbon sensor 78. Examples of hydrocarbon sensors 78 that may be used in the present invention are disclosed in U.S. Pat. Nos. 5,782,275; 5,843,212; 5,992,395; 6,460,579; 6,499,516; 6,644,360; and 6,712,101, all of which are incorporated by reference herein in their entireties.

An alternate way to determine flow direction in place of using a pressure sensor (or pressure sensor inside the UST 24) is to add a bi-directional flow meter (not shown) in the flow path of the carbon canister 42 at the inlet port 94 of the carbon canister 42, or the outlet port 52. After the cleansed air leaves the flow-limiting orifice 66, the cleansed air enters into an optional bi-directional flow meter that is coupled to the outlet port 52, via tubing, to measure the flow rate and/or direction of flow of the cleansed air on its way to the outlet port 64 to atmosphere during over-pressure conditions, or drawn into the outlet port 64 back into the carbon canister 42, during under-pressure conditions. The flow meter may be electronically coupled to the controller, via a communication line, so the controller can determine the flow rate and direction of the flow of air.

In addition to providing for the above mentioned need, flow measurements from the meter can also be used in combination with hydrocarbon concentration measurements from the hydrocarbon sensor 78 to estimate hydrocarbon, cleansed air flow rates, total hydrocarbon, and air emissions from the carbon canister 42 to the atmosphere. The total amount of hydrocarbon released by the canister through the outlet port 52 can be calculated as the hydrocarbon concentration, as measured by the hydrocarbon sensor 78, times the flow rate and time, or volume of flow, as measured by the meter. Any of these parameters may be compared to pass/fail thresholds to monitor carbon canister 42 performance and to indicate whether the carbon canister 42 is performing adequately or as needed, since if too much hydrocarbons are entering the outlet port 52, the carbon inside the carbon canister 42 is either saturated or the carbon canister 42 is not working properly, and alarms and/or reports can be generated in response thereto. The flow meter may also be used to measure incoming purging air flow rates and amounts to determine whether there is adequate purging for the amount of hydrocarbon cleansing occurring.

Pressure measurements, as described above from pressure sensor or UST ullage 28 or any other vent pressure sensor, can be combined with the known flow versus pressure characteristics of the flow-limiting orifice 66 to estimate bidirectional flow rates through the carbon canister 42, which can be used in place of flow rates from an added flow meter for the same purposes. This method provides the same capabilities but at a lower cost by eliminating the need for a separate flow meter.

Similarly, hydrocarbon emissions estimations can be accomplished without the addition of an hydrocarbon sensor 78 by mathematically modeling the known hydrocarbon loading and purging characteristics of the activated carbon particles or pellets 92. Amounts of hydrocarbons in the vapor 30 stream entering the carbon canister 42 are estimated by using the measured flow rates and assumed or estimated hydrocarbon concentration in the incoming hydrocarbon and air mixture. This concentration can be estimated using well known hydrocarbon in air saturation characteristics with respect to temperature. Temperature of the mixture can be assumed, for instance based on location and date or season of the year. Alternatively, it can be measured either with (typically) existing ATG tank probe temperature sensors in the ullage space 28 or by adding an optional temperature sensor for this purpose in the ullage space 28 or vapor 30 flow stream into the carbon canister 42. As the vapor 30 mixture enters the carbon canister 42, the estimated total amount of hydrocarbons is compared to the loading and capacity characteristics of the carbon 92 to maintain a continuous estimation of the hydrocarbon load in the carbon canister 42 for instance as total mass of hydrocarbons or as a percent of total carbon 92 capacity. If the hydrocarbon load gets too near or reaches capacity, an alarm can be issued or the optional solenoid operated control valve 54 can be closed to prevent hydrocarbon emissions or both. Alternatively, limited emissions can be allowed depending on regulatory guidelines after capacity is reached. In this instance, the issuing of the alarm and/or the closing off the valve 54 is delayed until the allowed emissions limit is reached. The ability to prevent or limit hydrocarbon emissions based on flow and optional temperature measurements combined with mathematically modeled loading estimations to control the valve 54, can be used to avoid the costly addition of a hydrocarbon sensor 78, since emissions cannot then normally occur.

When the optional valve 54 is in the closed state and pressure drops below zero gauge pressure or below a selected negative gauge pressure, for instance, −0.25 inches of water column relative to atmosphere, the valve 54 can be reopened to let normal carbon 92 purging occur.

As an adjunct to carbon 92 hydrocarbon load modeling, carbon 92 hydrocarbon purge modeling is included. Purge modeling is done by measuring the purge air inflow to the carbon canister 42 during periods of negative ullage pressure and using the known purging characteristics of the carbon 92. Using the flow and known purge characteristics, amounts of hydrocarbons purged from the carbon 92 are mathematically estimated and subtracted from the current hydrocarbon load to maintain an accurate, ongoing estimation of the total load. Both load modeling and purge modeling together are needed to maintain a continuous estimation of carbon 92 load conditions for multiple load and purge cycles.

During purging, when the estimated hydrocarbon load becomes zero or near zero, no further purging is needed. At that point, the optional solenoid valve 54 can be closed to prevent any further air from entering the ullage space 28 of the UST 24, since excess air can cause unwanted fuel evaporation and associated pressure rise in the UST 24.

When the optional valve 54 is in the closed state and pressure rises above zero gauge pressure, or a selected threshold above zero, for instance, +0.25 inches of water column relative to atmosphere, the valve 54 can be reopened to let normal carbon 92 loading resume to control excess UST 24 pressure.

After the cleansed air leaves the flow-limiting orifice 66 and meter, if provided, on its way to being released to atmosphere via the outlet port 64, an optional debris filter 70 may be provided inline in the tubing 62 coupled to the inlet side of the outlet port 64 to atmosphere to prevent contamination as well, as illustrated in FIG. 2. The debris filter 70 serves to prevent contamination of activated carbon inside the carbon canister 42, and also to prevent contamination of the flow-limiting orifice 66 and flow meter, if provided. A debris filter (not shown) may also be provided between the inlet port 94 and the chamber inside the carbon canister 42 to prevent contamination as well.

A three-way valve 120 (FIG. 2) may be provided to control the opening and closing of the inlet port 94. In this embodiment, the three-way valve 120 is coupled to the inlet port 94 via a tube or piping 122. The three-way valve 120 allows the carbon canister 42 to be isolated from the UST vent pipe 41 for operability and leak testing of the carbon canister 42 to ensure that the carbon canister 42 is properly operating and does not contain leaks. A handle 124 may be associated with valve 120 to permit manual control of the valve 120 setting. In a first position, the valve 120 couples the inlet port 94 to the vent pipe 41 via tubing 108 to adsorb hydrocarbons and return purged hydrocarbons to the UST 24 in a normal operating mode. However, the handle 124 can also close the valve 120 to isolate the carbon canister 42 completely. In this embodiment, the handle 124 can also place the valve 120 in a third position to couple the inlet port 94 to a test port 126 for testing of the carbon canister 42. Alternatively, the handle 124 can combine the closing of the valve 120 to isolate the carbon canister 42 and couple the inlet port 94 to a test port 126 simultaneously in a single step.

In order to validate that the carbon canister 42 flow versus pressure drop characteristics are within correct operating ranges to ensure the flow-limiting orifice 66, the solenoid valve 54, and/or the filters are not clogged or adversely affecting use of the orifice and pressure measurement as an accurate flow measurement means, a controlled nitrogen or other type of air source (not shown) may be connected to the test port 126 when the handle 124 is set to the test port 126 position. In this manner, flow/pressure testing can be performed on the carbon canister 42. Also, the solenoid valve 54 can be closed and the carbon canister 42 pressurized with the nitrogen or other air to show that the carbon canister 42 can hold pressure without leaking. These tests may be needed as annual "operability tests" or "leak tests" for California or other regulatory body certification requirements.

In order to conduct the operability test, a test procedure is performed. First, the three-way valve 120 is set to the test position by engaging the handle 124. This couples the inlet port 94 of the carbon canister 42 to the test port 126 and isolates the carbon canister 42 from the vent pipe 41. The controller directs the solenoid valve 54 to open by command over the communication line via automated or operator controlled input to the controller, such as through a tank monitor keypad for example. This simulates the operating mode of the carbon canister 42 when normally coupled to the UST 24. The nitrogen or other air source is then connected to the test port 126, and nitrogen is allowed to flow into the carbon canister 42 via the inlet port 94. For example the flow may be 18 cfh. The pressure at the test port 126 is then measured to determine if the flow-limiting orifice 66 and the components coupled to the outlet port 52 of the carbon canister 42 are properly operating and/or not clogged. If the pressure at the test port 126 is outside the expected range, which may be between 2" w.c.+/−0.2" w.c. for example, the operability test fails.

If the test does not fail, a leak test can also be performed to ensure that the carbon canister 42 does not contain a leak. In this instance, the leak test is most logically performed following a successful operability test since a controlled nitrogen or other air source is required to pressurize the carbon canister 42. The controller causes the solenoid valve 54 to close via automated or manual control. The carbon canister 42 is then pressurized at the test port 126 and an external valve (not shown) in-line with the nitrogen source is closed when the desired pressurization level for testing is reached, which may be 5 to 6" w.c. for example. The pressure drop rate is then measured at the test port 126. If the pressure drops or decays more than an expected value or rate, for example more than 1" w.c. in five minutes or less (i.e. >0.01 cfh at 2" w.c. for example), the leak test is deemed to have failed. Pressure loss is occurring as a result of an unacceptable leak in the carbon canister 42. It should be noted that the operability and leak tests may also be performed on any variation of the carbon canister 42.

Figure 4A:
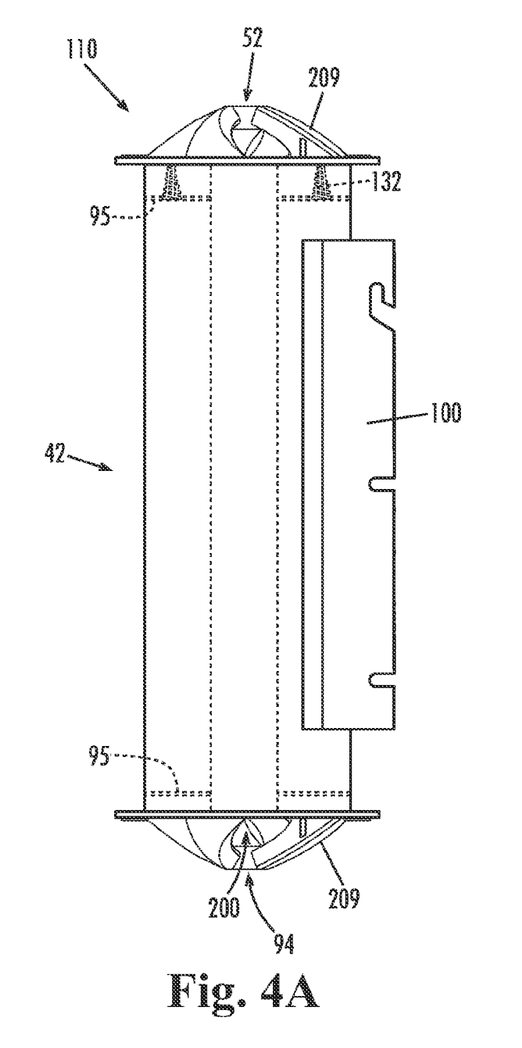
FIGS. 4A and 4B are partial side and front views, respectively, of the carbon canister, as shown in FIG. 1, showing in broken lines various internal components of the carbon canister.
Figure 4B:
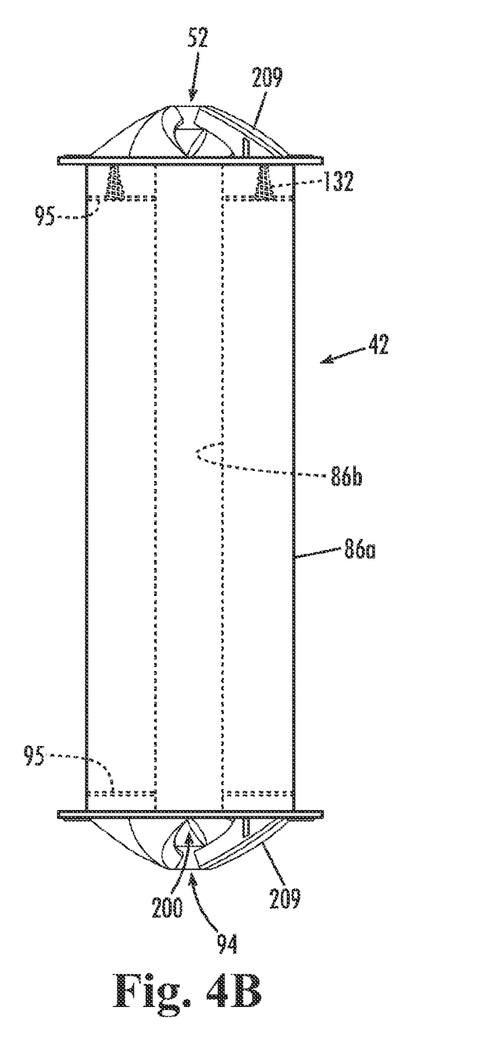

FIGS. 3, 4A and 4B illustrate some additional components that may be used internal to the carbon canister 42. Packing the carbon 92 tightly together inside the carbon canister 42 may also improve hydrocarbon adsorption so that vapors 30 from the UST 24 are more likely to pass across densely located carbon 92 as opposed to possible seepage areas resulting from less densely packed carbon 92. In this manner, one or more springs 132 are provided internally at the top of the carbon canister 42 between the base plate 201 of the canister outlet plate 110 and a retaining screen 95. When the canister outlet plate 110 is attached to the carbon canister 42 after carbon is loaded inside, the springs 132 push on the retaining screen 95 to in turn push on the carbon 92 inside. This has the effect of tightly packing the carbon 92 together inside the carbon canister 42.

Those skilled in the art will recognize improvements and modifications to the preferred embodiments of the present invention. All such improvements and modifications are considered within the scope of the concepts disclosed herein and the claims that follow.

What is claimed:

1. A carbon canister for use with a fuel storage system including a fuel storage tank and a vent line connected thereto, comprising:
   an inner container having a first end and a second end;
   an outer container having a first end and a second end, the outer container being disposed about an outer surface of the inner container such that the outer container and the inner container are concentric;
   a first end plate including a base plate and an inlet port that is axially displaced from the base plate, the first end plate being disposed at the first end of the inner container and the first end of the outer container;
   a second end plate including a base plate and an inlet port that is axially displaced from the base plate, the second end plate being disposed at the second end of the inner container and the second end of the outer container such that a first volume is defined by the inner container, the outer container, the first end plate and the second end plate, the inlet ports of the first and the second end plates being in fluid communication with the first volume; and
   hydrocarbon adsorbing activated carbon disposed in the first volume,
   wherein the vent line of the fuel storage tank is external to the carbon canister and the first volume of the carbon canister is in fluid communication with the fuel storage tank.

2. The carbon canister of claim 1, further comprising:
   a central aperture defined by the first end plate aligned with an interior volume of the inner container; and
   a central aperture defined by the second end plate aligned with the interior volume of the inner container,
   wherein a flow path for ambient air through the carbon canister is formed by the inner container and the central apertures of the first and the second end plates.

3. The carbon canister of claim 2, wherein the inner container and the outer container are substantially cylindrical.

4. The carbon canister of claim 2, further comprising a first retaining screen and a second retaining screen disposed within the first volume of the carbon canister such that the hydrocarbon adsorbing activated carbon is disposed between the first and the second retaining screens.

5. The carbon canister of claim 4, further comprising at least one spring disposed within the first volume such that the at least one spring biases the first retaining screen toward the hydrocarbon adsorbing activated carbon.

6. The carbon canister of claim 2, wherein the first end plate further comprises an air passage aperture defined by the base plate, and an air channel that extends from the inlet port to the air passage aperture such that the air channel is in fluid communication with the first volume of the carbon canister.

7. The carbon canister of claim 6, wherein the air channel of the first end plate extends radially outwardly from the inlet port to the air passage aperture.

8. The carbon canister of claim 7, wherein a first end of the air channel is adjacent the inlet port and has a cross-sectional area that is smaller than a cross-sectional area of a second end of the air channel that is adjacent the air passage aperture.

9. The carbon canister of claim 6, wherein the first end plate further comprises a plurality of air passage apertures defined by the base plate and a plurality of air channels, wherein each air channel extends outwardly from the inlet port to a corresponding air passage aperture.

10. The carbon canister of claim 9, wherein each air channel is curved in one of a clockwise and a counter-clockwise direction as it extends outwardly from the inlet port.

11. The carbon canister of claim 1, wherein the first volume of the carbon canister is in fluid communication with the vent pipe of the fuel storage tank.

12. A carbon canister for use with a fuel storage system including a fuel storage tank and a vent line connected thereto, comprising:
    a first container having a first end and a second end;
    a first end plate disposed at the first end of the first container, the first end plate including an inlet port, a base plate, an air passage aperture defined by the base plate, and an air channel that extends from the inlet port to the air passage aperture, the inlet port being axially spaced apart from said base plate;
    a second end plate including an inlet port, the second end plate being disposed at the second end of the first container such that a first volume is defined by the first container, the first end plate and the second end plate; and
    hydrocarbon adsorbing activated carbon disposed in the first volume,
    wherein first volume of the carbon canister is in fluid communication with the inlet ports of the first and the second end plates and with the fuel storage tank.

13. The carbon canister of claim 12, wherein the first container comprises an outer container and an inner container each having a first end and a second end, the inner container being within an inner surface of the outer container such that the outer container and the inner container are concentric.

14. The carbon canister of claim 13, further comprising:
    a central aperture defined by the first end plate aligned with an interior volume of the inner container; and
    a central aperture defined by the second end plate aligned with the interior volume of the inner container,
    wherein a flow path through the carbon canister is formed by the inner container and the central apertures of the first and the second end plates.

15. The carbon canister of claim 14, wherein the central apertures of the first end plate and second end plate are defined by the base plate of each.

16. The carbon canister of claim 14, wherein the inner container and the outer container are substantially cylindrical.

17. The carbon canister of claim 13, further comprising a first retaining screen and a second retaining screen disposed within the first volume of the carbon canister such that the hydrocarbon adsorbing activated carbon is disposed between the first and the second retaining screens.

18. The carbon canister of claim 12, wherein the air channel of the first end plate extends radially outwardly from the inlet port to the air passage aperture.

19. The carbon canister of claim 18, wherein a first end of the air channel is adjacent the inlet port and has a cross-sectional area that is smaller than a cross-sectional area of a second end of the air channel that is adjacent the air passage aperture.

20. The carbon canister of claim 19, wherein the first end plate further comprises a plurality of air passage apertures defined by the base plate and a plurality of air channels, wherein each air channel extends outwardly from the inlet port to a corresponding air passage aperture.

21. The carbon canister of claim 20, wherein each air channel is curved in one of a clockwise and a counter-clockwise direction as it extends outwardly from the inlet port to its respective air passage aperture.

* * * * *